2,967,798
Patented Jan. 10, 1961

United States Patent Office

2,967,798
INSECTICIDAL REPELLENT

Willis N. Bruce, Champaign, Ill., assignor to
Lee Ratner, Miami Beach, Fla.

No Drawing. Filed Jan. 31, 1958, Ser. No. 712,333

7 Claims. (Cl. 167—22)

This application discloses insecticidal repellent compositions of di-n-butyl succinate and thiocyanate insecticides now being claimed in my divisional United States Letters Patent application Serial No. 3,282, filed January 19, 1960; insecticidal repellent compositions of di-n-butyl succinate and organic phosphate insecticides now being claimed in my divisional United States Letters Patent application Serial No. 3,280, filed January 19, 1960; and insecticidal repellent compositions of di-n-butyl succinate and chlorinated hydrocarbon insecticides now being claimed in my divisional United States Letters Patent application Serial No. 3,281, filed January 19, 1960.

This invention relates to an insect control composition and has more particular reference to a combination of insecticide and insect repellent for protection against insects.

In my copending application, Serial No. 570,696, filed March 12, 1956, entitled Fly Repellent, I have disclosed as the active ingredient of a novel insect repellent di-n-butyl succinate and other n-propyl and n-butyl di-esters of maleic, fumaric, and succinic acids, all having the desired repellent characteristics and persistence. That application is directed to the combination of such repellents with certain materials among which may be mentioned piperonyl butoxide, iso-safrole, and various unsaturated fatty acids and fatty esters, which exert a synergistic effect upon the repellents.

I have discovered that combinations of those repellents with certain insecticides, such combinations being hereinafter sometimes called insecticidal repellents, produce a synergistic interaction providing not only relatively rapid insecticidal action with a residual repellency surviving such action, but also repellency and toxicity in the combination which are substantially greater, respectively, than the repellency of the repellent and knock-down properties of the insecticide combined therewith when used separately. I have further found that those repellents display a stabilizing effect on pyrethrum, allethrin, cyclethrin, and other insecticides of other oxo-allyl cyclopentenyl ester and other esters of the mono- and di-chrysanthemum carboxylic acids such that their killing power is extended many times longer than is the case with these insecticides not so combined.

In addition to the insecticides of oxo-allyl cyclopentenyl ester or other esters of the mono- and di-chrysanthemum carboxylic acids, I have found that any of "Thanite" (isobornyl thiocyanoacetate), "Lethane 384" (B-butoxy, B-thiocyano diethyl ether), or other thiocyanate insecticides; "Diazinon" (O, O - diethyl - O - (2 - isopropyl - 4 - methyl-pyrimidyl(6))thiophosphate), malathion, "Korlan" (O,O-dimethyl-O-(2,4,5-trichlorophenyl)phosphorothioate), or other organic phosphate insecticides; and methoxychlor, DDT (p,p' - dichloro - diphenyl - trichlorethane), "Perthane" (diethyl diphenyl dichloroethane), or other chlorinated hydrocarbon insecticides, when combined with the repellent, result in an insecticidal repellent having the advantageous interaction between the repellent and insecticide and, to a greater or lesser degree, the stabilizing effect just mentioned above.

An object of the invention is the provision of a novel insecticidal repellent which is of great value in protecting cattle, horses, hogs, and other animals from insect attack. It is also exceedingly useful in the home in reducing the number of house flies, mosquitoes, cockroaches, ants, silverfish, and other annoying insects.

The invention is also useful in the preservation of stored grain and other products subject to insect damage in storage. The novel insecticidal repellent is exceedingly effective in controlling insects in barns and other buildings where flies and the like breed profusely and prove highly annoying and from which dirt, contamination, and disease are spread. In short, the composition prepared in accordance with my invention may be employed in any situation where insecticides or repellents are now used.

Another object of the invention is the provision of an insecticidal repellent wherein certain insecticides, contained in a composition prepared in accordance with my invention, are now useful where such insecticides alone are dangerous.

The use of certain exceedingly effective insecticides is dangerous or forbidden for many purposes. For instance, the list of insecticides permitted for the control of flies on dairy animals or in dairy barns is highly restricted because of danger to the animal itself or because of the possibility of the insecticide being transmitted into the cow's milk and so to the consumer. The use of certain insecticides is likewise hazardous in conjunction with meat animals in that the meat derived therefrom may carry insecticidal residues to the human consumer.

A further object of the invention is the provision of an insecticidal repellent wherein a substantially smaller quantity of insecticide is required for the performance of a desired insecticidal function and the chance, therefore, of danger to the animal or to the human consumer is greatly diminished. The approved insecticides may therefore be used without painstaking control of quantity, and the prospects of other more hazardous insecticides being approved for use on animals are good.

Other objects and advantages of my invention will be apparent from the following description thereof, and the invention consists in the combination of one or more of the above-identified repellents with one or more of the above-identified insecticides to provide an insecticidal repellent which has greater repellency or knock-down properties than the same quantities of the repellent and insecticide in the insecticidal repellent respectively have when used alone.

As will be understood by those skilled in the art, the effectiveness of an insecticide or repellent depends on the amount or concentration of active material deposited on a given area or, in other words, on the quantity which a fly or other insect will encounter on a cow or in a barn, or in a house.

The novel composition is prepared preferably as a solution or mixture of the repellent and insecticide in or with a suitable vehicle, carrier, or diluent. The proportions employed are such as to leave on the treated surface the desired amount or concentration of the insecticidal repellent when the directions for application of the insecticide-repellent solution have been followed. Specimen solutions are, for back rubbers and oil spray concentrate, about 20% insectidical repellent and 80% "No. 9" oil, kerosene, or other suitable mineral or vegetable oil; for an oil spray solution, I employ 0.5% combined insecticide and repellent and the balance, "No. 9" oil or the above stated equivalent thereof. In the event it is desired to make an oil spray from the concentrate, the concentrate may be further diluted from about 20 to about 40 times with "No. 9" oil or its equivalent. An appropriate emulsion concentrate is about 20% of combined insecticide and repellent and about 10% of Atlox 1045A (polyoxyethylene sorbitol esters of mixed oleic and lauric acids) or other emulsifier, and balance "No. 9" oil. In use, the emulsion concentrate may be diluted from about 5 to about 40 times with water.

For the sake of brevity I have herein used the term "synergism." While I believe this term is aptly employed in the description of my invention, the term "potentiation of action" has occurred to me as being less restrictive. It will be appreciated that the improved effectiveness of the novel composition may be attributable in part, at least, to the preservative effect which the repellents exert on certain of the insecticides. Mere preservation of stability of the insecticide is not, however, adequate to account for the improved repellency or for the augmented knock-down effects of the composition when compared with the repellency of the repellent and the knock-down effects of the repellent and insecticide, respectively, when used alone. Another part, therefore, of the improved activity may be attributable to biological factors. Possibly the improved performance may be attributable in part to still further factors of which I have no knowledge. The fact remains, however, that a cooperative effect is noticed between the insecticide and repellent which amply justifies the use of the term "synergism."

In discussing the efficacy of the novel insecticidal repellent reference will hereinafter be made to knock-down time and repellency. Knock-down time is determined by enclosing a counted number of flies in a Petri dish having a filter paper therein impregnated with a stated quantity of a stated impregnant in terms of milligrams per square foot. The efficacy of the impregnant then is measured in terms of the minutes taken to achieve 100% knock-down of the flies.

Repellency is determined by folding filter papers impregnated with the stated quantity of impregnant in terms of milligrams per square foot so as to form a free-standing shallow conical cup. Weighed lactose pellets are then placed in the bottom of each of the cups or inside the apex of the cone.

An exposure cage is provided with a horizontal turntable in it and a plurality of treated cups are deposited on the turntable about the rim thereof. Illumination and a source of water are likewise provided in the cage. Among the filter papers is included a check or control pellet in an untreated cup.

Flies are introduced into the cage on the basis of approximately 150 flies per cup. The turntable is rotated slowly. At the end of a measured period of time, or at about that time when the check or control pellet is totally consumed, the filter papers are withdrawn from the cage and the pellets remaining dried and weighed. Repellency is expressed as the percentage which the end weight of the pellet associated with any particular impregnant bears to the initial weight of the pellet.

It is well known that the insecticides of oxo-allyl cyclopentenyl ester and other esters of the mono- and di-chrysanthemum carboxylic acids including allethrin, cyclethrin, and the pyrethrins are among the most effective and quickest acting insecticides. Such insecticides, however, have a relatively low order of persistence under exposure to ultraviolet or sunlight and are relatively expensive. They are nevertheless useful in the composition of the invention as shown by the data hereinafter set forth. Illustrative of the invention, I show in Table 1 the efficacy of pyrethrum as an insecticide alone in various area concentrations in knock-down time; the efficacy of pyrethrum and repellent separately in various area concentrations as to repellency (the repellent has no insecticidal properties); and the efficacy of various combinations of the repellent and insecticide as to both knock-down time and repellency. These determinations were made following a four hour exposure of the impregnated filter papers to ultraviolet light of daylight intensity at 36° C.

In the following tables the term "repellent" refers to the n-butyl di-ester of succinic acid.

In Tables 1 through 5 which follow, the two columns at the left headed "R" and "I" relate to the concentrations of repellent and insecticide, respectively, in terms of milligrams per square foot. The columns headed "R" and "I" under "Percentage repellency of" indicate the percentage repellency of the repellent and insecticide, respectively, in the concentration given in the left-hand columns. The column headed "Sum" is the arithmetic total of the separate "R" and "I" columns. The column headed "Combined R+I" gives the repellency of the combination of repellent and insecticide in the respective concentrations given in the left-hand columns. The "R," "I," and "Combined R+I" under "Knock-down time" give the same relative information as to the knock-down determinations in minutes.

TABLE 1

*Repellent and pyrethrum*

[Exposed 4 hours to ultraviolet light at 36° C.]

| Mgs./sq. ft. | | Percent Repellency of— | | | | Knock-down Time in minutes | | |
|---|---|---|---|---|---|---|---|---|
| R | I | R | I | Sum | Combined R+I | R | I | Combined R+I |
| 100 | 0 | 76 | ----- | 76 | 76 | None | None | ----- |
| 99.9 | 0.1 | 74 | 0 | 74 | 78 | None | None | 48 |
| 99.5 | 0.5 | 71 | 0 | 71 | 82 | None | None | 22 |
| 97.5 | 2.5 | 66 | 1 | 67 | 88 | None | None | 10 |
| 90 | 10 | 57 | 6 | 63 | 94 | None | None | 6 |
| 50 | 50 | 36 | 15 | 51 | 97 | None | 65 | 8 |
| 10 | 90 | 12 | 30 | 42 | 66 | None | 32 | 15 |
| 0 | 100 | ----- | 46 | 46 | 46 | None | 28 | 28 |

The repellency of any combination of repellent and insecticide might be expected to be no more than the arithmetic sum of the repellencies of the materials appraised individually. The column headed "Sum" in Table 1 gives this arithmetic total. A comparison of this column with the "Combined R+I" column which indicates the performance of the combination, indicates clearly the snyergistic effect or potentiation of action involved in the present invention. It will be noted that the highest degree of repellency achieved by the use of the materials separately is that of pure repellent at 100 milligrams per square foot which gives a repellency of 76%. On the other hand, the application of the combination at the rate of 50 milligrams per square foot of each of the components results in a repellency of 97%. It will also be noted that the repellency of the insecticidal repellent increases progressively as insecticide is added from the best the pure repellent is capable of to the remarkable effectiveness of the equal proportions of the two components of the novel insecticidal repellent.

The same situation obtains with respect to knock-down time or the efficacy of the materials as an insecticide. The repellent has no insecticidal properties. Pyrethrum and the other insecticides of oxo-allyl cyclopentenyl esters or other esters of the mono- di-chrysanthemum carboxylic acids, as is well known, deteriorate rapidly under use in sunlight. Under the circumstances under which the observations of Table 1 were made, the insecticide alone demonstrated no insecticidal properties until a concentration of 50 milligrams per square foot was employed and then 65 minutes were required for 100% knock-down. At 100 milligram per square foot, 28 minutes were required for 100% knock-down. A 6 minute knock-down time is achieved by the use of only 10 milligrams per square foot of the insecticidal repellent comprising 90 parts by weight of the repellent and 10 parts by weight of the insecticide. Here again, it will be seen that pyrethrum does not function in the expected manner. Pyrethrum is one of the most expensive of insecticides and its use is often limited to circumstances where a quick knock-down is desired or where tolerance to other insecticides has been developed. By the combination of pyrethrum with the repellent, I provide an insecticidal repellent having greater utility than either of its active components.

The economic factor is a matter of substantial importance here, also. The repellent is a relatively inexpensive material. In order to obtain satisfactory knock-down results from pyrethrum alone under the circumstances described above, it must be applied at a rate of 90 to 100 or more milligrams per square foot. I achieve far superior knock-down effects with an application rate of only 10 milligrams per square foot of pyrethrum when combined with the repellent, thus achieving not only a greatly improved knock-down time, but a materially lower cost as well.

The exact formulation of the combination of the two components for practical field use depends to some extent on the primary effect desired. If peak repellency is wanted, together with whatever insecticidal properties may accompany it, it will be seen from Table 1 that the combination for that effect is about equal parts by weight of the two components. If optimum knock-down is desired, the formula by reference to Table 1 is about 90 parts by weight of the repellent and about 10 parts by weight of the insecticide. It will be evident from that table that both the insecticidal properties of the combination directed primarily to repellency and the repellent properties of the combination directed primarily to insecticidal use are very little off optimum. In view of the relatively great expense of pyrethrum and the excellent performance of a composition including about 90 parts by weight of repellent and about 10 parts by weight of pyrethrum, such a composition affords good commercial advantages from the economical viewpoint as well as in performance.

Table 2 shows the repellency of the repellent and pyrethrum, individually and in combination, following a ten hour exposure to ultraviolet light, or the equivalent of a full day's exposure to sunlight.

TABLE 2

*Repellent and pyrethrum*

[Exposed 10 hours to ultraviolet light at 32° C.]

| Mgs./sq. ft. | | Percent Repellency of— | | | |
|---|---|---|---|---|---|
| R | I | R | I | Sum | Combined R+I |
| 100 | 0 | 20 | None | 20 | 20 |
| 99.9 | 0.1 | 18 | None | 18 | 50 |
| 99.5 | 0.5 | 18 | None | 18 | 65 |
| 97.5 | 2.5 | 17 | None | 17 | 70 |
| 90 | 10 | 17 | None | 17 | 80 |
| 50 | 50 | 10 | None | 10 | 84 |
| 10 | 90 | 0 | None | 0 | 35 |
| 0 | 100 | 0 | None | 0 | 0 |

The additional exposure to ultraviolet results, as shown in Table 2, in an enormously diminished efficacy of the repellent alone, and the insecticide alone loses whatever repellent effect it once may have had. Thus, at 100 milligrams of repellent per square foot, the repellency factor is only 20% as compared with 76% under the four hour ultraviolet exposure. With the equal part combination, however, a repellency of 84% is still maintained and the combination of about 90 parts by weight of repellent and about 10 parts by weight of insecticides displays an 80% repellency. The persistency and effectiveness of the repellent effect of the combination is thus conclusively demonstrated.

TABLE 3

*Repellent and allethrin*

[Exposed 4 hours to ultraviolet light at 36° C.]

| Mgs./sq. ft. | | Percent Repellency of— | | | | Knock-down Time in minutes | | |
|---|---|---|---|---|---|---|---|---|
| R | I | R | I | Sum | Combined R+I | R | I | Combined R+I |
| 100 | 0 | 78 | 0 | 78 | 78 | None | None | ---- |
| 99.9 | 0.1 | 76 | 0 | 76 | 89 | None | None | 54 |
| 99.5 | 0.5 | 73 | 0 | 73 | 90 | None | None | 24 |
| 97.5 | 2.5 | 66 | 0 | 66 | 95 | None | None | 16 |
| 90 | 10 | 58 | 2 | 60 | 97 | None | None | 13 |
| 50 | 50 | 40 | 5 | 45 | 96 | None | None | 17 |
| 10 | 90 | 13 | 10 | 23 | 49 | None | None | 30 |
| 0 | 100 | 0 | 12 | 12 | 12 | None | 54 | 54 |

Table 3 illustrates the results derived from the repellent and allethrin, individually and in combination, under a similar exposure to ultraviolet light. It will be noted that while allethrin alone has virtually no repellency, and the repellent alone falls off steadily from the maximum repellency of 78% at 100 milligrams per square foot, a combination of 90 parts by weight of the repellent and 10 parts by weight of allethrin applied at the rate of 100 milligrams per square foot, achieves a repellency of 97%, far beyond the additive effects of the two components individually. The same situation obtains with respect to the insecticidal characteristics. The repellent alone again has no insecticidal properties and the allethrin alone has lost substantially all its knock-down powers during the exposure to light. The same combination as described above, however, achieves the excellent knock-down time of thirteen minutes.

TABLE 4

*Repellent and cyclethrin*

[Exposed 4 hours to ultraviolet light at 36° C.]

| Mgs./sq. ft. | | Percent Repellency of— | | | | Knock-down Time in minutes | | |
|---|---|---|---|---|---|---|---|---|
| R | I | R | I | Sum | Combined R+I | R | I | Combined R+I |
| 100 | 0 | 78 | 0 | 78 | 78 | None | None | ---- |
| 99.9 | 0.1 | 75 | 0 | 75 | 81 | None | None | 58 |
| 99.5 | 0.5 | 74 | 0 | 74 | 84 | None | None | 34 |
| 97.5 | 2.5 | 73 | 0 | 73 | 88 | None | None | 12 |
| 90 | 10 | 70 | 0 | 70 | 92 | None | None | 13 |
| 50 | 50 | 36 | 5 | 41 | 88 | None | None | 20 |
| 10 | 90 | 7 | 7 | 14 | 70 | None | None | 43 |
| 0 | 100 | 0 | 10 | 10 | 10 | None | None | ---- |

Cyclethrin and the repellent achieve, as indicated in Table 4, comparable effects. By combining 90 parts by weight of the repellent and 10 parts by weight of cyclethrin, a repellency of 92% is achieved as compared with the optimum of the repellent alone of 78%. As to knock-down, cyclethrin alone was wholly destroyed by the exposure to light. The combination, however, achieved a knock-down time of 12 minutes at about 97.5 parts by weight of the repellent and about 2.5 parts by weight of cyclethrin and a knock-down time of 13 minutes at about 90 parts by weight of the repellent and about 10 parts by weight of cyclethrin.

From the foregoing tables, it will be seen that the presently preferred embodiment of the invention is an insecticidal repellent comprising a combination of, for example, di-n-butyl succinate and pyrethrum, allethrin, cyclethrin, or other insecticide of oxo-allyl cyclopentenyl esters or other esters of the mono- and di-chrysanthemum carboxylic acids in the weight proportions of from about 99.5% to about 10% of said succinate and from about 0.5% to about 90% of said insecticide, alone or in a suitable carrier.

It is well known that such insecticides alone may lose their effectiveness as insecticides rapidly when exposed to light. In combination with the repellent, however, they result in the novel insecticidal repellent which, as shown above, is more persistent and effective both as an insecticide and as a repellent than any of those insecticides or the repellent, respectively, when used alone.

Other insecticides, which alone are less subject to loss of potency or effectiveness than those just mentioned, show similar results when combined with the repellent and, therefore, are considered as insecticides or compounds related to pyrethrum, allethrin, cyclethrin, and other insecticides, of oxo-allyl cyclopentenyl esters or other esters of the mono- and di-chrysanthemum carboxylic acids. Among those related insecticides, as already pointed out, are "Thanite," "Lethane 384," and other thiocyanate insecticides; "Diazinon," malathion, "Korlan," and other organic phosphate insecticides; and methoxychlor, DDT, "perthane" and other chlorinated hydrocarbon insecticides. When any of those insecticides is combined with the repellent, a substantially enhanced repellency is displayed by the combination as compared with the repellent alone, and the insecticidal properties of the combination likewise are generally more effective than any of the components individually, although in some instances the added effectiveness of the combination is not so marked as in the case of pyrethrum.

TABLE 5

*Repellent and "Thanite"*

[Exposed 6 hours to ultraviolet light at 33° C.]

| Mgs./sq. ft. | | Percent Repellency of— | | | | Knock-down Time in minutes | | |
|---|---|---|---|---|---|---|---|---|
| R | I | R | I | Sum | Combined R+I | R | I | Combined R+I |
| 100 | 0 | 67 | 0 | 67 | 67 | None | | |
| 99 | 1 | 64 | 0 | 64 | 70 | None | | 34 |
| 90 | 10 | 54 | 8 | 62 | 81 | None | 62 | 22 |
| 50 | 50 | 36 | 18 | 54 | 93 | None | 35 | 10 |
| 10 | 90 | 11 | 35 | 46 | 88 | None | 27 | 12 |
| 2 | 98 | 0 | 42 | 42 | 84 | None | 22 | 14 |
| 0 | 100 | 0 | 44 | 44 | 44 | None | 20 | 20 |

From the foregoing table, it will be seen that while optimum repellency of 67% is achieved by the repellent alone at the concentration of 100 milligrams thereof per square foot, a combination of equal parts of repellent and "Thanite" achieves a repellency of 93%. Likewise, while the best knock-down time of 20 minutes is achieved by "Thanite" at 100 milligrams per square foot, the same equal combination achieves a knock-down time of 10 minutes. Acceptable results are achieved where "Thanite" makes up from about 0.5% to about 98% and the repellent makes up from about 99.5% to about 2% by weight of the combination, the presently preferred combination being about 25% of the repellent and about 75% for "Thanite."

In all of the tables above the least combination tested at each end of the proportionate scales shows an improvement of performance both as to repellency at the dominant repellent end of the scale and as to knock-down at the dominant insecticide end of the scale, and as the insecticidal repellent approaches the center of the scales generally, the improvement becomes more marked and significant. The increased efficiency in both respects, it will be recalled, is over and above the additive effects of the components determined separately. I term this region between the added effects of the separate components and the effects of the combination the area of synergism.

Table 6 shows various compositions of the novel insecticidal repellent using "Diazinon," malathion, "Lethane 384," and "Korlan" as the insecticide and the effectiveness of each of those compositions.

TABLE 6

*Propyl and butyl di-esters of maleic, fumaric, and succinic combined with various insecticides*

| Formula | Mgs./sq. ft | Time aged in Ultraviolet | Percent Repellency | Knock-down Time in Minutes |
|---|---|---|---|---|
| Repellent | 100 | 4 hrs. @ 29° C | 93 | None |
| Repellent | 99 | 4 hrs. @ 29° C | 91 | None |
| "Lethane 384" | 1 | 4 hrs. @ 29° C | 0 | None |
| Combined | 99 and 1 | 4 hrs. @ 29° C | 99 | 48 |
| Repellent | 90 | 4 hrs. @ 29° C | 86 | None |
| "Lethane 384" | 10 | 4 hrs. @ 29° C | 6 | 22 |
| Combined | 90 and 10 | 4 hrs. @ 29° C | 97 | 12 |
| Repellent | 10 | 4 hrs. @ 29° C | 11 | None |
| "Lethane 384" | 90 | 4 hrs. @ 29° C | 29 | 11 |
| Combined | 10 and 90 | 4 hrs. @ 29° C | 67 | 4 |
| Repellent | 100 | 4 hrs. @ 34° C | 82 | None |
| Repellent | 80 | 4 hrs. @ 34° C | 69 | None |
| "Diazinon" | 20 | 4 hrs. @ 34° C | 0 | 12 |
| Combined | 80 and 20 | 4 hrs. @ 34° C | 90 | 12 |
| Repellent | 50 | 4 hrs. @ 34° C | 45 | None |
| "Diazinon" | 50 | 4 hrs. @ 34° C | 0 | 11 |
| Combined | 50 and 50 | 4 hrs. @ 34° C | 71 | 10 |
| Repellent | 100 | 8 hrs. @ 34° C | 45 | None |
| Repellent | 90 | 8 hrs. @ 34° C | 40 | None |
| Malathion | 10 | 8 hrs. @ 34° C | 0 | None |
| Combined | 90 and 10 | 8 hrs. @ 34° C | 77 | 155 |
| Repellent | 50 | 8 hrs. @ 34° C | 26 | None |
| Malathion | 50 | 8 hrs. @ 34° C | 0 | 194 |
| Combined | 50 and 50 | 8 hrs. @ 34° C | 70 | 95 |
| Repellent | 10 | 8 hrs. @ 34° C | 6 | None |
| Malathion | 90 | 8 hrs. @ 34° C | 0 | 162 |
| Combined | 10 and 90 | 8 hrs. @ 34° C | 58 | 90 |
| Repellent | 100 | 4 hrs. @ 36° C | 80 | None |
| Repellent | 90 | 4 hrs. @ 36° C | 77 | None |
| "Korlan" | 10 | 4 hrs. @ 36° C | 0 | 40 |
| Combined | 90 and 10 | 4 hrs. @ 36° C | 89 | 35 |
| Repellent | 50 | 4 hrs. @ 36° C | 51 | None |
| "Korlan" | 50 | 4 hrs. @ 36° C | 0 | 34 |
| Combined | 50 and 50 | 4 hrs. @ 36° C | 65 | 31 |

It will be appreciated from the foregoing table that the repellency of the combinations is materially improved over that of the components in all cases, and in the case of malathion and "Lethane 384," there is a very marked acceleration of knock-down time.

Thus, according to the invention, as to the insecticides of Table 6, "Lethane 384" from about 1% to about 98%, "Diazinon" from about 5% to about 50%, malathion from about 2% to about 98%, and "Korlan" from about 2% to about 50% of the combination with the repellent provide the presently preferred insecticidal repellents wherein the repellent in each case makes up the balance of the combination. I have, however, found that acceptable results are obtained when the repellent ranges between from about 2% to about 99.5% and any one of those insecticides varies between from about 98% to about 0.5% by weight of the combination, the preferred proportions for the respective insecticides being "Lethane 384," about 80%; "Diazinon," about 50%; malathion, about 80%; and "Korlan," about 80% with the repellent in each case making up the balance of the combination.

I have conducted field tests on compositions prepared in accordance with my invention and found the results to be uniformly excellent. A formulation of the repellent with pyrethrum was sprayed on several herds of dairy animals. The formula employed was 0.50% repellent and 0.05% pyrethrum in an oil solution, each animal being sprayed with two ounces of the solution. Untreated control animals were maintained in each herd. At the end of four hours there was 100% repellency to stable flies, at the end of eight hours, 86% repellency, and at the end of twelve hours, 80% repellency. The average number of flies on the control animals were, at four hours, 9.0; at eight hours, 17.6; and at twelve hours, 19.6. Another test showed 75% repellency of stable flies after twenty-eight hours. Still another test showed a similar formulation applied in similar quantity provided cattle with 100% protection against horse flies for a period of two full days. The average number of flies on the control animals was 9.

Illustrative of the novel insecticidal repellent employing chlorinated hydrocarbon insecticides, Table 7 below shows the results obtained where various combinations of DDT and the repellent were employed.

TABLE 7

*Repellent and DDT*

| Mgs. | | Percent Repellency of Combination | Knock-down Time of Combination (minutes) |
|---|---|---|---|
| R | I | | |
| 11 | 0 | 82.0 | 0 |
| 10 | 1 | 85.0 | 45 |
| 8 | 3 | 93.0 | 11 |
| 5 | 5 | 90.0 | 15 |
| 3 | 8 | 36.0 | 22 |
| 0 | 11 | 0 | 32 |

Comparable results were obtained where methoxychlor and "Perthane," respectively, were substituted for the DDT in the insecticidal repellent. The presently preferred proportion where any of those chlorinated hydrocarbon insecticides is employed in the novel insecticidal repellent is about 75% repellent and about 25% insecticide by weight of the combination, acceptable results being obtained where the repellent makes up from about 2% to about 99.5% and the insecticide makes up from about 98% to about 0.5% by weight of the combination.

Field tests were made by means of a back rubber of various formulations of methoxychlor with the repellent. The materials were tested in relative proportions of from about 50% to about 84% methoxychlor and from about 50% to about 16% repellent. All compositions gave excellent results and the 16% repellent to 84% insecticide combination gave the particularly notable results of 100% control of horn flies and 88% control of horse flies over a period of thirty days. Untreated control animals were infested with an average of 1,475 horn flies and about five horse flies per head.

It will be apparent from the foregoing description that the combination of repellents of the character here involved together with the above disclosed insecticides gives altogether unsuspected and unforeseen results in augmenting the repellency of the repellent and the toxicity of the insecticide and maintaining the effectiveness of the components in both respects over a substantially prolonged period of time. The economic consequences of my invention are important. Protection against insect attack for animals, households, stored grains, persons, etc., is more easily, more effectively, and more permanently achieved at lower cost. This protection is achieved with greater safety in that the enhanced effectiveness of the insecticidal components which are in many cases toxic to some degree to animals and humans, makes possible the use of materially reduced quantities thereof. Of all the tested insecticides in combination with the repellent, I have found the repellency and, in a great majority of instances, the insecticidal effectiveness as well to be greatly improved.

It is thought that the invention and its attendant advantages will be understood from the foregoing description, and it will be apparent that various changes may be made in the composition and ingredients thereof without departing from the spirit and scope of the invention or sacrificing all of its material advantages, the forms hereinbefore described being merely preferred embodiments thereof.

I claim:
1. An insecticidal repellent comprising a combination of di-n-butyl succinate and an insecticide selected from the group consisting of pyrethrum, allethrin, and cyclethrin wherein said succinate makes up from about 99.5% to about 10% and said insecticide makes up from about 0.5% to about 90% by weight of said combination.
2. An insecticidal repellent composition comprising a combination of di-n-butyl succinate and allethrin wherein said succinate makes up from about 97.5% to about 50% and said allethrin makes up from about 2.5% to about 50% by weight of said combination.
3. An insecticidal repellent solution comprising a combination of di-n-butyl succinate and allethrin wherein said succinate makes up about 90% and said allethrin makes up about 10% by weight of said combination.
4. An insecticidal repellent composition comprising a combination of di-n-butyl succinate and cyclethrin wherein said succinate makes up from about 97.5% to about 50% and said cyclethrin makes up from about 2.5% to about 50% by weight of said combination.
5. An insecticidal repellent solution comprising a combination of di-n-butyl succinate and cyclethrin wherein said succinate makes up about 90% and said cyclethrin makes up about 10% by weight of said combination.
6. An insecticidal repellent composition comprising a combination of di-n-butyl succinate and pyrethrum wherein said succinate makes up from about 97.5% to about 50% and said pyrethrum makes up from about 2.5% to about 50% by weight of said combination.
7. An insecticidal repellent solution comprising a combination of di-n-butyl succinate and pyrethrum wherein said succinate makes up about 90% and said pyrethrum makes up about 10% by weight of said combination.

References Cited in the file of this patent

UNITED STATES PATENTS

| 2,761,806 | Boyer | Sept. 4, 1956 |
| 2,813,877 | Lambrech | Nov. 19, 1957 |

OTHER REFERENCES

King: U.S. Dept. Agr. Handbook, No. 69 (1954), pp. 113–115.

Lindquist: U.S. Dept. Agr. Bull. No. 775, April 1949, pp. 42, 43.

Smith: J. Eco. Ent., vol. 42, June 1949, pp. 439–440.

King: Chem. Evaluated as Insecticides, USDA Handbook No. 69, p. 316.

Eddy: J. Eco. Ent., vol. 47, No. 3, June 1954, pp. 501–505.

Chemical Abst., vol. 49, 1955, pp. 16308(a), 14256(f), 557(g), 10568(f), 13579(i), 16311(b), 16313(c), 16317(e).

De Ong: Chem. and Use of Pesticides, 2nd ed., 1956, Reinhold Pub. Co., pp. 129, 230, 231, 221, 222.

Wadley: The Evidence Required to Show Synergistic Action of Insecticides and a Short Cut in Analysis, USDA, ET-223, June 1945, pp. 1–7.